Patented Nov. 30, 1937

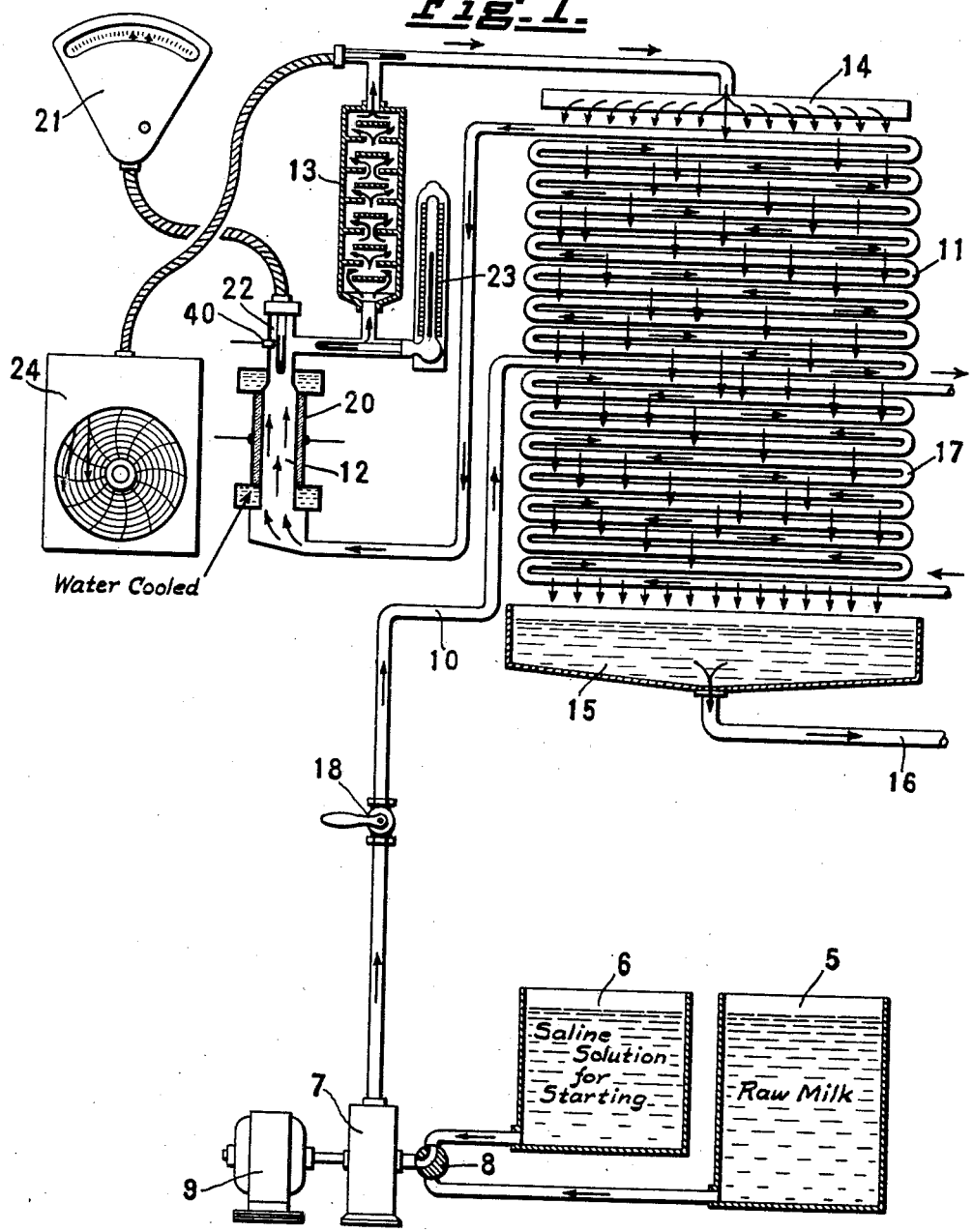

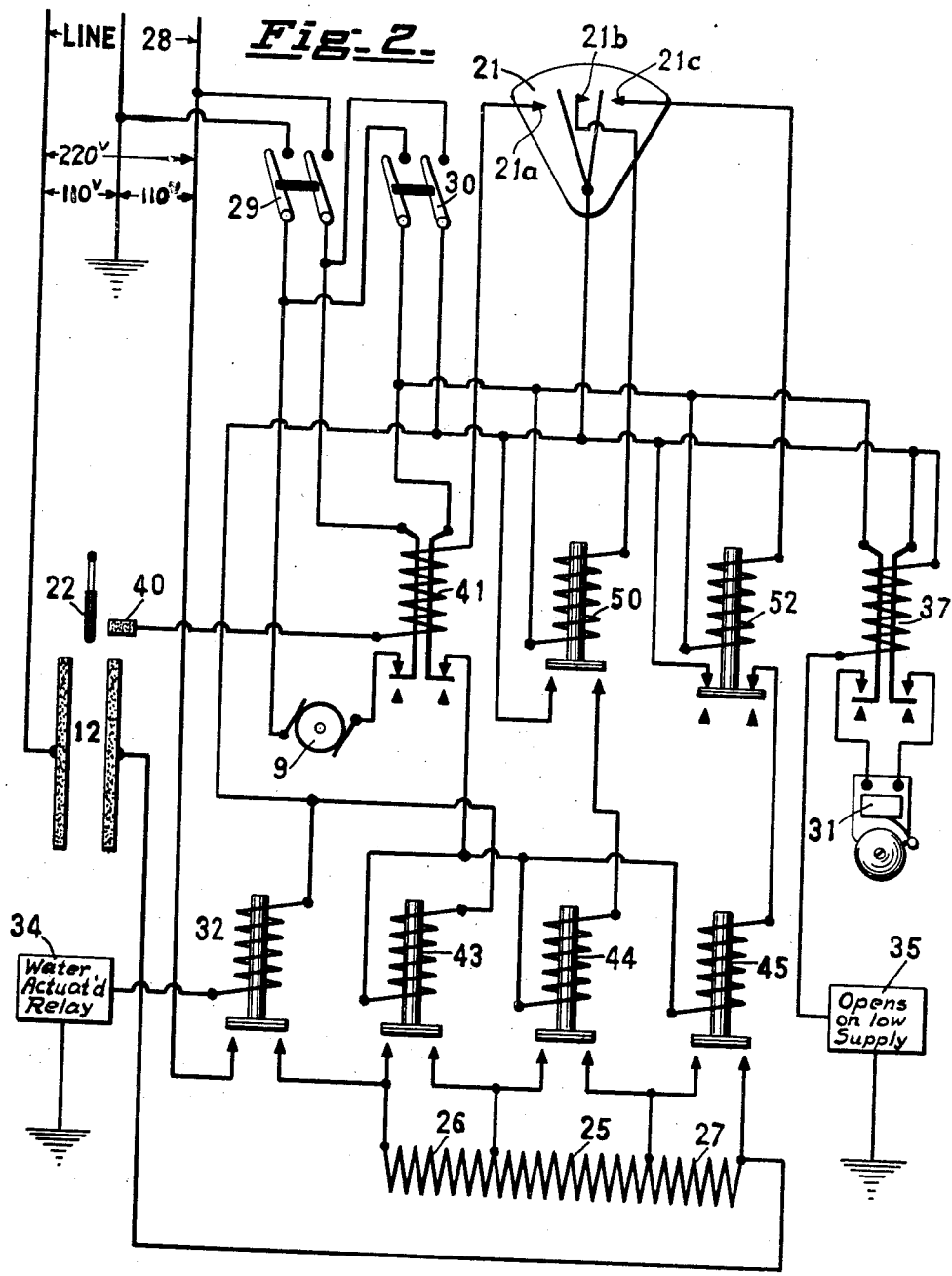

2,100,326

UNITED STATES PATENT OFFICE 2,100,326

PASTEURIZATION OF MILK

Benjamin E. Getchell, Plainville, Conn., assignor to The Trumbull Electric Manufacturing Company, Plainville, Conn., a corporation of Connecticut Application March 21, 1936, Serial No. 70,170

8 Claims. (Cl. 219—40)

My invention relates to a system and apparatus particularly for pasteurizing milk by the action of electricity.

The main object is to provide a practical, reliable and efficient system embodying relatively simple mechanism.

Another object is to provide a system in which the apparatus can be set for one or more predetermined rates of delivery so as to synchronize the milk flow with a bottling machine.

The system has also been designed to control the treatment temperature within a predetermined narrow range and prevent the passage through the system of milk which has not been properly pasteurized.

I have also sought to provide a system which is wholly automatic after it has once been started in operation and which will automatically operate to compensate for variations in the temperature of the supplied liquid, the conductivity of the supplied liquid, and the room temperature and variations in the line voltage.

Although the apparatus was designed primarily for the pasteurization of milk, it will be understood that certain features of the invention are applicable to similar electrical treatment of other liquids where temperature control is essential.

In describing the construction and mode of operation, I will for simplicity generally refer to the system and apparatus especially designed for the treatment of milk.

The system embodies an electrode chamber and a circulating system through which the liquid is forced by the action of an electrically motor driven pump. This circulating system includes a heat exchanger or regenerator through which the cold milk is forced and which is subject to the action of the heated milk so that the outflowing heated milk is cooled and the inflowing milk is preliminarily heated by the treated milk.

The temperature of the treated milk is controlled by varying the electrical input to the heating chamber by increasing or decreasing resistance in series with the electrodes of the heating chamber. This resistance may be arranged in three sections, one of which is normally in the circuit with the electrodes of the heating chamber, and the other two are normally out of circuit with the electrodes. Under abnormal conditions any one, two or three of these resistance sections may be automatically cut in or out of the heating circuit as may be required and which will be hereinafter set forth. The flow of milk through the system may be controlled by the manual operation of a hand valve so as to synchronize with the speed of the bottling machine to which the treated milk is fed.

Variations in the temperature of the raw milk, in the electrical conductivity of the milk, in the room temperature or in the line voltage will be compensated for automatically by increasing or decreasing the resistance in the heating circuit.

For this purpose, an electrical control device 10 is employed, having a temperature sensitive element subjected to the milk immediately after it leaves the electrode chamber, and switch elements such, for instance, as are more fully shown in my application, Serial Number 752,223, filed November 9, 1934, the action of which controls the starting and stopping of the pump motor and the cutting in and out of the resistance sections in the electrical circuit.

Fig. 1 is a diagrammatic view showing the liquid circulating system.

Fig. 2 is a diagrammatic view showing the electrical control system.

The liquid to be treated is contained in one or more reservoirs such as 5 and 6, one of which may contain, for instance, raw milk and the other a liquid for cleaning the circulating system or for facilitating the starting of the action of the apparatus without wasting milk.

The pump 7 is preferably of the rotary type so designed that liquid can flow backward through it when the pump is stopped.

A 3-way valve 8 controls the selection of liquid. The electric motor 9, which drives the pump is of the type which is self-starting when the current is turned on.

The circulating system includes the conduit 10, the regenerative coils 11, the heating chamber 12, the holding chamber 13, the spreader or spray head 14, and the collecting trough 15, which discharges through the pipe 16 to the bottling machine or other disposal point. The hot milk is allowed to run down over the surface of the regenerative coils by which it is cooled and then over the refrigerating or cooling coils 17 to bring the temperature of the milk down to that required. The rate of flow of the liquid through the system is controlled by a manually operable valve 18.

To prevent the overheating of the electrodes, themselves, I provide suitable water cooling means 20 such as shown and described in my former application above referred to. The automatic circuit changing device 21 is actuated by a temperature sensitive element 22 arranged at the top of the heating chamber. The temperature at this point or closely adjacent thereto may be indicated by a thermometer 23. The temperature at the outlet of the holding chamber 13 is measured and recorded by a suitable instrument 24.

The temperature of the raw milk supply is supposed to be approximately 50° F. but may vary from 35° F. to 60 F. without interfering with the operation of the system. The requirement for pasteurizing milk by the high temperature method is 160° F. held 15 seconds. The temperature commonly used in this process is 162° F. so as to provide a reasonable leeway for variation without going below the 160° limit. In pasteurizing other liquids, or milk for other purposes, it may be desirable to use higher temperatures than those previously specified, and the system is so constructed that any pasteurizing temperature above 160° may be used.

The heat exchanger or preheater is preferably designed to raise the temperature of the milk to approximately 125° before it is electrically treated. In such a case, the electrode chamber will be so designed as to add approximately 35° to the temperature. When pasteurizing milk, it is customary to immediately chill it below 50° by means of the refrigerating or cooling unit. The cooling liquid to be employed will depend, of course, upon the temperature requirements. At certain times, or in certain places, it may be necessary to employ brine, or other refrigerant, while at other times or places, ordinary tap water may be sufficiently cold.

The system requires alternating current but does not require high voltage. It is designed for use on standard commercial current such as 220 volts A. C. The electrodes of the heating chamber 12 are adapted to be connected in the main line in series with a number of resistances.

In describing the following electrical system, it should be noted that for the purpose of uniformity and simplicity, I have shown the movement of all relays and contactors as being downward when energized, and upward when unenergized.

The electrical system includes the following parts:

There may be a main line disconnect switch, (not shown) through which an electrical power supply such as 110/220 volt three-wire, single phase, alternating current is furnished to the system.

29 is a manually-operated switch, which controls the power furnished to the pump motor circuit. It also determines the energization of the line side of control switch 30.

21 is a temperature controlled contactor. This contactor is operated by means of a bulb 22 in the milk flow just above the heating chamber and is responsive to variations in the temperature of the milk as it leaves the heating chamber. In this contactor are three contacts—21a which actuates a circuit guarding against milk-flow below 160°; 21b to correct temperature if it drops one-half degree or more below the predetermined pasteurizing point, and 21c to correct temperature if it raises one-half degree or more above the predetermined pasteurizing point. 21 has a manually adjustable means (not shown) for setting the pasteurizing temperature at whatever point may be desired above 160°. When the pasteurizing temperature is set above 170, contact 21a is inoperative.

12 is a heating chamber, which is supplied with electrical power controlled directly by means of a resistance system 26, 25 and 27 and indirectly by means of the contacts which are actuated by respective relays 32, 43, 44 and 45.

34 is a water actuated relay, which is in circuit with the controlling winding of a magnetic contactor 32, which controls the power furnished to the heating chamber circuit. Failure of cooling water to flow over the electrodes of the heating chamber will cause this relay to open the controlling magnet circuit of contactor 32 and thus interrupt the supply of power to the heating chamber 12, due to the opening of the controlled contacts actuated by contactor 32.

35 is a milk actuated relay, which is in series with the controlling circuit of an alarm relay 37. If the supply of milk in the raw milk tank drops below a predetermined level, it will cause the opening of the magnetic circuit of relay 37, allowing an alarm 31 to notify the operator.

9 is a pump motor which is under manual control of switch 29 and also under automatic control of relay 41.

40 is an auxiliary electrode located in the milk stream just above the heating chamber and adjacent to bulb 22 of temperature contactor 21. It is in series with the controlling circuit of relay 41 and if it is immersed in a fluid so that current is flowing by means of this electrode when contact 21a closes, the circuit is completed through the controlling winding of relay 41 to electrode 40 and thence through the fluid to ground. This causes relay 41 to open the pump motor circuit and thus stops the flow of milk. If there is no conducting fluid in contact with the electrode 40, the circuit including the controlling winding of relay 41 will not be completed and the pump will not stop.

Resistances 26, 25 and 27 are connected in series and are under the automatic control of magnetic contactors 43, 44 and 45 respectively. These resistances are thereby automatically cut in or out of the circuit supplying power to the heating chamber 12, as occasion may demand and as hereinafter explained.

32 is a magnetic contactor in the circuit supplying power to the heating chamber 12. This contactor is under the automatic control of the water-actuated relay 34, as hereinbefore explained in discussing this latter relay.

43 is a magnetic contactor, which is under the automatic control of the contacts of relay 41, which latter normally holds this contactor closed.

This contactor controls resistance 26 and normally holds it out of the circuit to the heating chamber 12, but in case that relay 41 acts to stop the flow of milk due to element 21 closing contacts 21a because of a temperature below 160°, the contacts of contactor 43 open, thus inserting resistance 26 into a series circuit with the heating chamber in order to reduce the current and prevent over-heating of the milk during this period.

44 is a magnetic contactor which is under the control of relay 50, which latter normally holds the contacts of 44 in an open position. Contactor 44, in turn, controls resistance 25 and normally keeps resistance 25 in series circuit with the heating chamber 12. If the pasteurizing temperature drops one-half degree below the set pasteurizing point, 21 closes the contacts 21b, which allows the energization of relay 50. Relay 50, in turn, allows the energization of magnetic contactor 44, which closes its contacts and shunts resistance 25 out of the series circuit with the heating chamber 12, thus increasing the power reaching chamber 12 and causing the actual pasteurizing temperature to rise.

45 is a magnetic contactor which is under control of relay 52, which normally holds the contacts of 45 closed. Contactor 45, in turn, controls resistance 27 and normally holds it out of series circuit with the heating chamber 12. If the temperature of the milk rises one-half degree above the set pasteurizing point, 21 closes the contacts 21c.

This allows the energization of relay 52, which opens the magnetic circuit of contactor 45, causing its contacts to open and introduce resistance 27 into series circuit with the heating chamber. This lowers the power supplied to the heating chamber and causes the pasteurizing temperature to be reduced.

Magnetic contactors 44 and 45 are also under automatic control of relay 41 in the same manner as described for magnetic contactor 43, and when the pasteurizing temperature drops below the 160° limit, and the pump stops, contactors 44 and 45 will open their respective contacts, introducing resistances 25 and 27 in series with resistance 26 to assist in reducing the power supplied to heating chamber 12.

To start the system into operation, either one of two methods may be employed, the first and preferable of which is by the use of a solution of salt in water of about the same electrical conductivity as the milk. In this method, the temperature controller is set for pasteurizing temperature above 170° to prevent the pump from stopping on flow temperatures below 160°. Valve 8 is set to permit the fluid from the saline solution tank to flow through the system. Valve 18 is set to approximately the flow desired. The valve supplying electrode water is turned on for the purpose of keeping the electrodes cool during operation. The waste water from the electrodes actuates the water relay 34 so that when control switch 30 is turned on, circuit will be established through magnetic contactor 32 to supply power to the electrode chamber.

Switch 29 is now closed, which starts the pump and supplies power to the line side of switch 30. Switch 30 is now closed, which actuates the control circuits and causes power to be supplied to heating chamber 12. Fluid leaving the chamber one-half degree or more below the pasteurizing setting causes 21 to contact at 21b. This energizes relay 50, which in turn energizes magnetic contactor 44, causing it to close and shunt resistance 25 out of circuit with heating chamber 12. Resistance 26 is also shunted out of the heating circuit because magnetic contactor 43 is held closed by relay 41. Resistance 27 is also shunted out of the heating circuit because magnetic contactor 45 is held closed by relay 52. Thus during the period of bringing the temperature from cold up to the pasteurizing point, full power is supplied to heating chamber 12. The fluid passing through heating chamber 12 is gradually raised in temperature and is passed over the regenerative coils 11. This results in raising the temperature of the cold fluid as it enters heating chamber 12 and, in turn, raises the temperature as it leaves the heating chamber. This increased heat, in turn, raises the regenerative temperature still further and the cycle continues until the temperature of the treated fluid reaches the pasteurizing temperature as set at 21. 21 may now be set at a pasteurizing temperature of 162°. This will cause contact 21b to open the circuit of relay 50. Relay 50, in turn, will open the circuit of contactor 44, causing its contacts to open and throw resistance 25 into circuit with the heating chamber 12.

Contactor 21 will contact at 21c, which will energize relay 52, causing its contacts to open the magnetic circuit of magnetic contactor 45. Magnetic contactor 45 will then open and throw resistance 27 into circuit with the heating chamber. The insertion of resistances 25 and 27 into the heating circuit reduces the power to heating chamber 12 and the pasteurizing temperature will rapidly drop until it reaches within one-half degree of 162°, for which 21 is set. At this time, contact 21c will open the circuit of relay 52, causing its contacts to close and energize magnetic contactor 45, causing its contacts to close and shunt resistance 27 out of the circuit to heating chamber 12, thus increasing the power to 12 and preventing a further drop of temperature. The temperature of the treated fluid will now stabilize at 162° and any variation one-half degree above or below that point will cause resistances 25 or 27 to be cut in or out of the circuit to correct the temperature to the set point. Valve 8 may now be thrown over so as to cause the milk to flow from the raw milk tank and follow the saline solution through the system, thus driving all of the water out of the system and establishing a steady flow of milk. As soon as this is accomplished, the milk is led to the bottling machine by means of conduit 16.

If for any reason the temperature of the milk rises or lowers one-half degree above or below the pasteurizing temperature, resistances 25 or 27 will be automatically cut in or out of the circuit to correct same, as previously described.

If the speed of flow does not synchronize with the bottling machine speed, it may be increased or decreased by manual operation of valve 18 and the controls will act to maintain the temperature of the pasteurized milk at the proper point automatically, regardless of any change that may be made within reasonable limits.

If due to a sudden change of raw milk temperature, drop of voltage, or change of speed of flow, the pasteurizing temperature drops below 160°, 21 will contact at 21a, establishing a circuit through relay 41 to electrode 40 to ground. This causes relay 41 to open the circuit of the pump motor, thus immediately interrupting the flow of milk through the system. The milk will then flow back by gravity through the electrode chamber for re-heating. Relay 41 also opens the circuit of contactors 43, 44 and 45, causing resistances 26, 25 and 27 to be thrown into circuit with the power to the heating chamber 12, thus reducing the power through this chamber and preventing excessive over-heating of the milk during its backward flow. As soon as all of the milk below 160° temperature, that attempted to pass out of the heating chamber, is returned the change in temperature of bulb 22 will cause 21 to open the contact 21a, which will interrupt the circuit through relay 41. This will allow the pump to resume operation and will restore resistances 26, 25 and 27 into their normal circuit position.

If due to radiation of heat, all the milk up to the spreader pipe has dropped below 160°, it will all be returned through the heating chamber 12 without causing 21a to open.

If this happens, as soon as all of the milk has returned through the heating chamber 12, the circuit from electrode 40 to ground will be broken due to absence of milk at this point, and that circuit change in turn, will cause relay 41 to reclose the pump circuit and cause the pump to start.

If for any reason the cooling water ceases to flow over the outside of the electrodes of heating chamber 12, the circuit of magnetic contactor 32 will be broken at 34, causing 32 to open and interrupt the supply of power to the heating chamber 12. This, in turn, will cause a sudden drop of pasteurizing temperature, which will cause 21 to contact at 21a and stop the pump, as previously described. When all of the milk has been returned to the heating chamber, a periodic succession of starting and stopping will occur without further heating of the milk. This will notify the operator that something is wrong. As soon as the cooling water flow is restored, relay 34 will restore the circuit to magnetic contactor 32, which will close and again supply power to the heating chamber 12 and operation will automaticaly be re-established, as previously described.

When the supply of raw milk reaches a predetermined low level in the raw milk tank, relay 35 will open, causing relay 37 to close its contacts and start the alarm 31 into operation, notifying the operator that he must either replenish his raw milk supply or prepare to shut down the plant.

The process of shutting down the plant is the reverse of starting, and is accomplished simply by throwing the three-way valve 8 in position to supply saline solution to the pump. This solution follows the milk through the plant, driving it all out, at which time the controls may be thrown off and the plant shut down.

The second method of starting is to start directly with the raw milk. In using this method, valve 8 is thrown into position to feed raw milk into the system. Electrode cooling water is turned on, as before, temperature controller 21 is set at the desired pasteurizing temperature of 162°, switch 29 is closed, starting the pump, and switch 30 is immediately closed, which will put into operation the control system. The pump will operate until the milk reaches electrode 40. The temperature of this first flow of milk will be far below the pasteurizing temperature due to the fact that regeneration of heat has not yet been established. Therefore, 21 will be in contact at 21a. Relays 50 and 52, and magnetic contactors 43, 44 and 45 will be in such position as to supply full power to the electrode chamber, as described in the previous method of starting.

As soon as the milk contacts at electrode 40, circuit will be established from 21a through relay 41, through 40 to ground, causing relay 41 to act and open the pump circuit. This will stop the flow of milk and cause it to flow back by gravity through the heating chamber where it is further treated by a reduced current through resistances 26, 25 and 27, as previously described.

As soon as all of the milk, that attempted to pass, has returned to the chamber, circuit from electrode 40 to ground will be broken and relay 41 will close the circuit through the pump and cause it to start throwing the milk up to electrode 40 and bulb 22. If the temperature has not yet reached 160°, the pump will again stop and the milk will be returned, as previously described. The pump will then again start and another test will be made on temperature, and if it has reached a temperature above 160°, the pump will continue in operation until the milk, that was in the chamber and received the extra treatment, has passed through. This will again be followed by milk below 160° because of the fact that regeneration has not yet been established, and this second lot of milk will be retained in the electrode chamber until it reaches the proper pasteurizing point, as previously described, and this operation continues until finally enough milk has been permitted to pass to establish regeneration and bring the regenerative temperature up sufficiently high to permit continuous operation. The plant will then go into normal continuous operation until all of the milk has been pasteurized.

The process of shutting down is practically the same as in the previous method except that fresh water may be used to drive the milk out of the system.

I claim:

1. In a pasteurizing system, a liquid circulating system including a heating chamber having electrodes and a liquid heated preheater, a motor driven pump for forcing a liquid through said circulating system, manually controlled means for synchronizing the rate of flow of the liquid with the demand of a bottling machine, means for applying an alternating current to the electrodes for heating the liquid forced through the heating chamber, means for increasing and decreasing the value of the current passing through the heating chamber including a number of resistances, one of which is normally in the heating circuit, and the others out of the heating circuit, means controlled by the temperature of the heated liquid for cutting any or all of the resistances in or out of the heating circuit.

2. In a milk pasteurizing system, a liquid circulating system including a heating chamber having water cooled electrodes and a milk-heated preheater, an electric motor driven pump for forcing milk through said circulating system, means for regulating the rate of flow of the milk, means for applying an alternating current to the electrodes for heating the milk forced through the heating chamber, means controlled by the temperature of the heated milk for increasing and decreasing the value of the current passing through the heating chamber, said means including a number of resistances, one of which is normally in the heating circuit, the others normally out of the heating circuit, means controlled by the temperature of the heated milk for starting and stopping the operation of the pump when the temperature is varied a certain amount and cutting any or all of the resistances into or out of the heating circuit.

3. In a pasteurizing apparatus, means for electrically heating a liquid, means for flowing the liquid through the heater, means for interrupting the flow of liquid through the heater when the temperature of the liquid which has passed through the heater falls below a predetermined value, means enabling the liquid to be passed back through the heater, means for heating the liquid only a small amount on its back flow, means for automatically again passing the liquid through the heater when its back flow has ceased, means for adjusting the rate of flow through the heater to the rate of operation of a bottling machine and means for controlling the temperature of liquid passing through the heater by a change of current in voltage on the heater to compensate for any changes in liquid temperature within a narrow range while the rate of liquid flow through the heater is maintained substantially constant.

4. A pasteurizing apparatus including an electric heater, means for passing liquid through the heater at a substantially constant rate, a continually operating make and brake device for cutting out resistances in the heater circuit, and temperature responsive means for controlling the time during which a resistance is in the heater circuit with respect to the time the resistance is out of the circuit, said make and break device and the temperature responsive means being adapted to control the temperature of the heated liquid within a fraction of a degree.

5. In a pasteurizing apparatus, a heater for liquid, means responsive to the temperature of liquid flowing through the heater at a substantially constant rate for intermittently increasing the voltage of the heater when such temperature has fallen slightly below a normal pasteurizing temperature, and temperature responsive means for intermittently decreasing the voltage of the heater when the liquid temperature rises slightly above said normal, the duration of the increase and decrease of the heater output being also responsive to the liquid temperature.

6. In a pasteurizing apparatus, a heater for liquid, a pump for passing the liquid through the heater, means responsive to the temperature of the liquid after it has passed through the heater for increasing the heating of the liquid when its temperature drops slightly from a normal pasteurizing value and for reducing the power of the heater when the liquid temperature rises slightly above said normal value, means responsive to said last mentioned means for stopping the pump and re-passing the liquid through the heater when the temperature of the liquid which has passed the heater falls below a predetermined minimum which is below that for increasing the heating of the liquid, means for cooling the heater during its normal operation, and means for stopping the heating action of the heater in response to a reduction of said cooling means.

7. In a pasteurizing system, a liquid circulating system including, a heating chamber having electrodes and a liquid-heated preheater, a motor driven pump for forcing liquid through said circulating system, manually controlled means for synchronizing the rate of flow of the liquid with the demand of a bottling machine, means for applying an alternating current to the electrodes for heating the liquid forced through the heating chamber, means for increasing and decreasing the value of the current passing through the heating chamber including a number of resistances, one of which is normally in the heating circuit, means controlled by the temperature of the heated liquid for starting and stopping the operation of the pump when the temperature is varied a certain amount and cutting other resistances into and out of the heating circuit.

8. In a milk pasteurizing system, a liquid circulating system including, a heating chamber having water cooled electrodes and a milk-heated preheater, an electric motor driven pump for forcing milk through said circulating system, means for regulating the rate of flow of the milk, means for applying an alternating current to the electrodes for heating the milk forced through the heating chamber, means controlled by the temperature of the heated milk for increasing and decreasing the value of the current passing through the heating chamber, said means including a number of resistances, one of which is normally in the heating circuit, means controlled by the temperature of the heated milk for starting and stopping the operation of the pump when the temperature is varied a certain amount and cutting the other resistances into and out of the heating circuit.

BENJAMIN E. GETCHELL.